Figure 1:
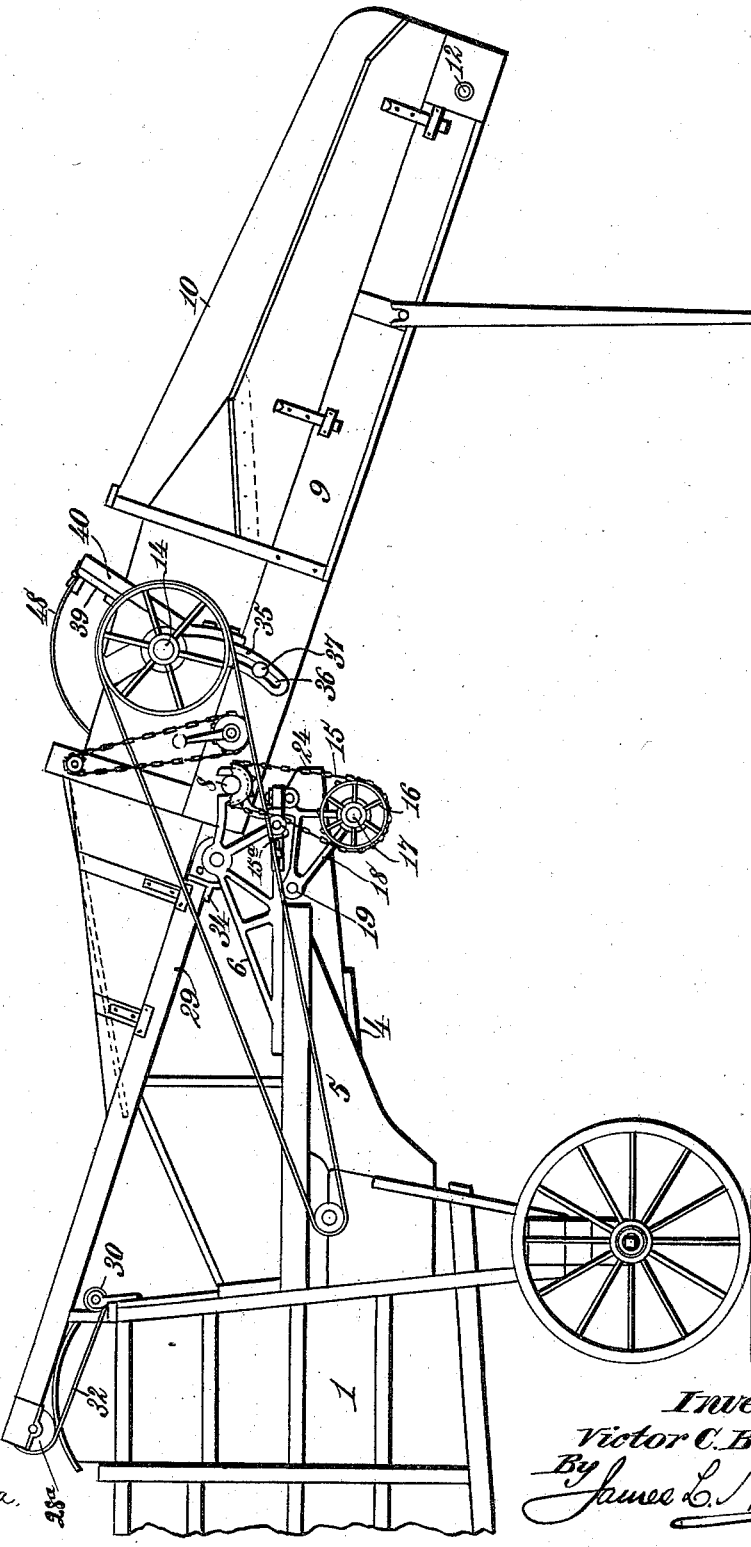

(No Model.) 4 Sheets—Sheet 1.

V. C. BAILEY.
BAND CUTTER AND FEEDER.

No. 526,287. Patented Sept. 18, 1894.

Witnesses.
Robert Everitt.
G. W. Rea.

Inventor:
Victor C. Bailey.
By James L. Norris.
Atty.

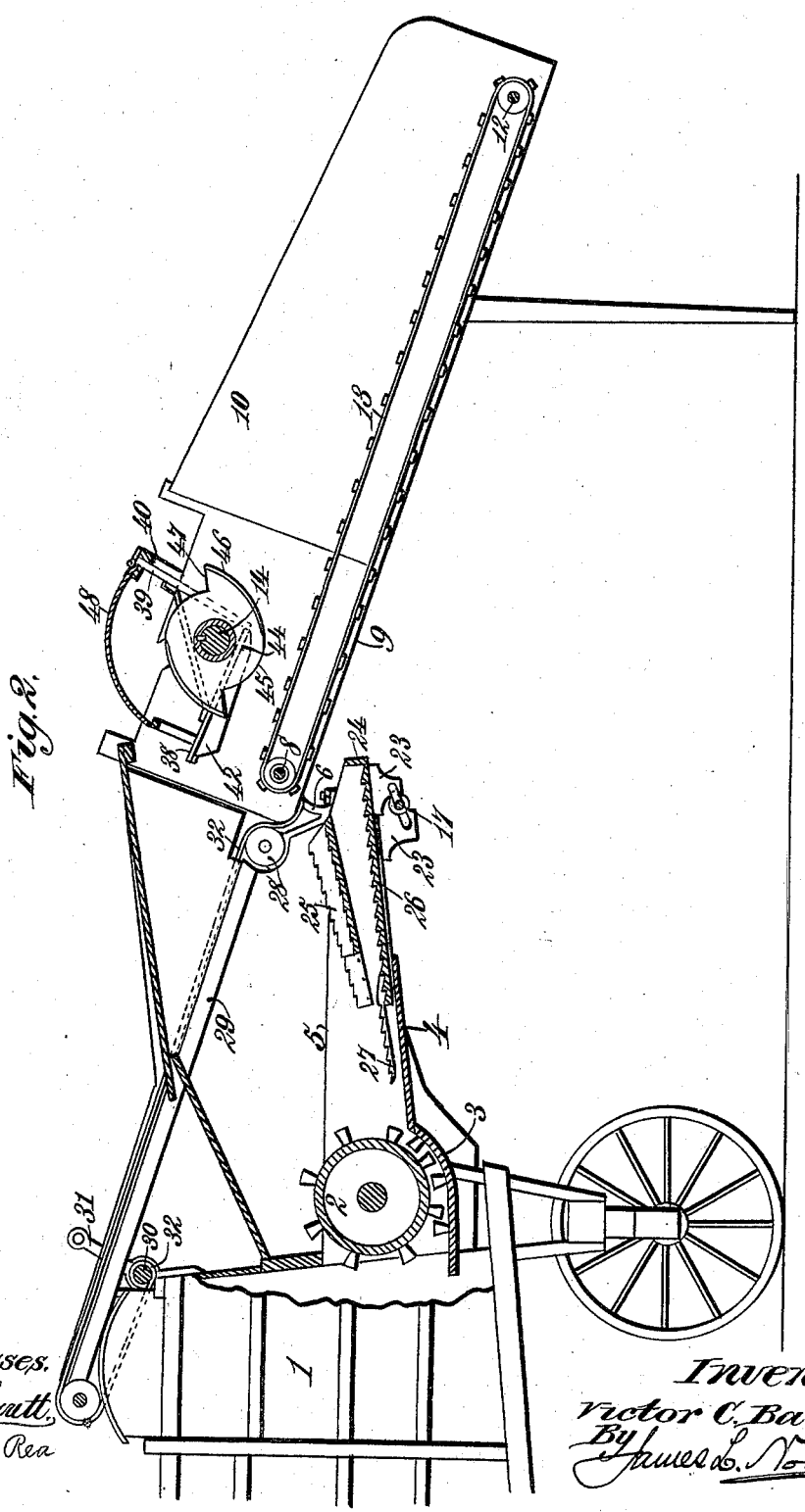

(No Model.)
V. C. BAILEY.
BAND CUTTER AND FEEDER.
No. 526,287. Patented Sept. 18, 1894.
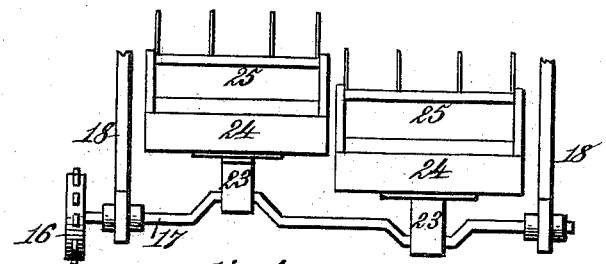
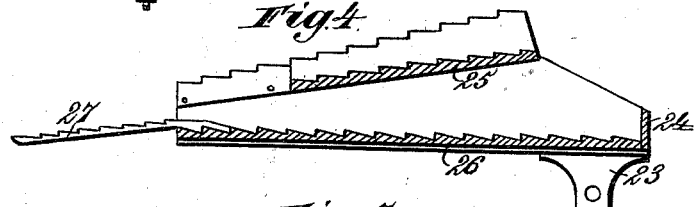
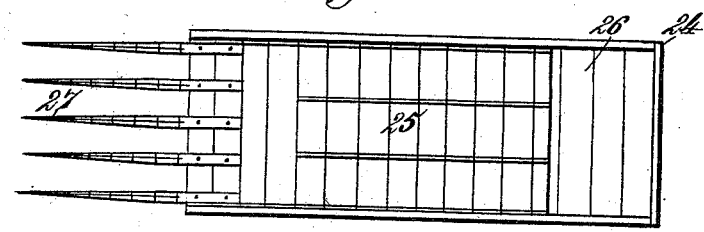
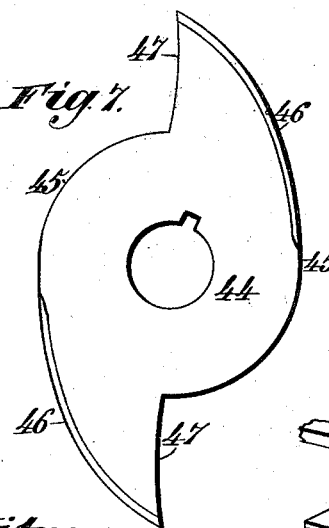
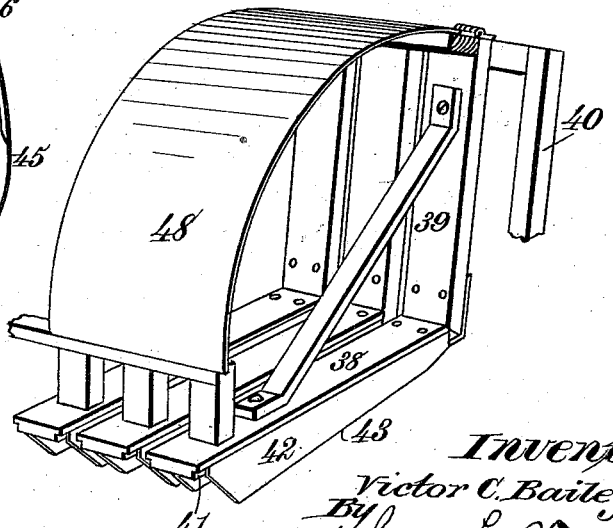
Witnesses:
Robert Everett
G. W. Rea
Inventor:
Victor C. Bailey,
By James L. Norris
Atty.

(No Model.)  4 Sheets—Sheet 4.
V. C. BAILEY.
BAND CUTTER AND FEEDER.
No. 526,287.  Patented Sept. 18, 1894.
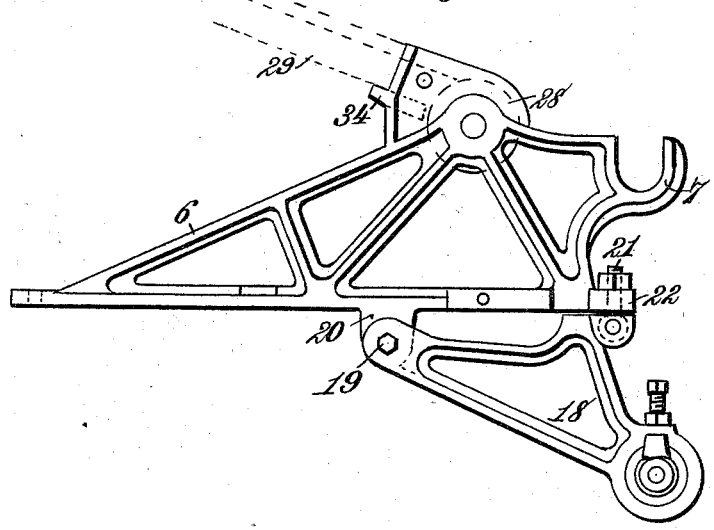
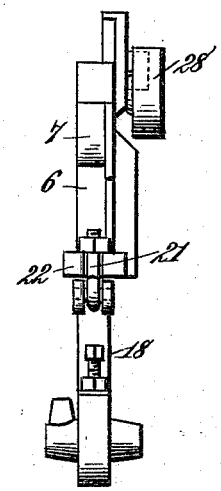
Fig. 8.  Fig. 9.
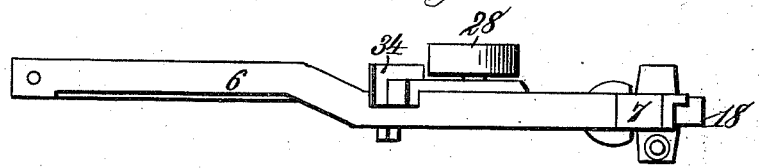
Fig. 10.
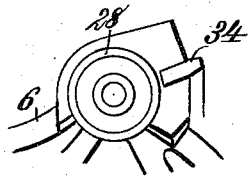
Fig. 11.
Witnesses.
Robert Garrett.
G. W. Rea,
Inventor.
Victor C. Bailey,
By James L. Norris.
Atty.

UNITED STATES PATENT OFFICE.

VICTOR C. BAILEY, OF BATTLE CREEK, MICHIGAN, ASSIGNOR TO THE ADVANCE THRESHER COMPANY, OF SAME PLACE.

BAND-CUTTER AND FEEDER.

SPECIFICATION forming part of Letters Patent No. 526,287, dated September 18, 1894.

Application filed April 6, 1894. Serial No. 506,575. (No model.)

*To all whom it may concern:*

Be it known that I, VICTOR C. BAILEY, a citizen of the United States, residing at Battle Creek, in the county of Calhoun and State of Michigan, have invented new and useful Improvements in Band-Cutters and Feeders for Grain-Separators, of which the following is a specification.

This invention has for its object to improve the construction and operation of band-cutters and feeders for grain separating machines, whereby the bands of the grain bundles are properly severed, the feeding of the grain is under better control than heretofore, and the grain is spread and uniformly delivered to the thrashing devices of the separator.

The invention also has for its object to provide improved knives or cutters for severing the bands of the grain bundles, whereby the grain is pressed down while the bands are being severed and choking of the knife-guard is prevented.

The invention also has for its object to provide a band-cutter wherein the knife and the knife-guard are susceptible of being simultaneously adjusted without interfering with the driving mechanism of the band-cutter, for varying the position of the knives and knife-guard relatively to the bundle-carrier or grain-table of the band-cutter, to suit the conditions required for large or small bundles, or for bundles which are wet and tangled, or for feeding loose grain to the separator through the band-cutter.

The invention also has for its object to provide a novel arrangement of knife-guard whereby the grain is properly moved under the knives, even if such grain is unduly piled in front of the knife-guard, while the grain is effectually prevented from being carried up and wedged between the separated and slotted parts of the knife-guard and from winding on the knife-shaft and the grain is caused to more uniformly advance toward the separating machine.

The invention also has for its object to provide improved means whereby the band-cutter can be bodily elevated upon inclined guide-ways or rails and supported thereby for transportation with the grain separating machine.

The invention also has for its object to provide a new and improved grain-feeding pan which will control and uniformly feed the grain and catch and deliver to the separator such trash, heads, and loose grain as may fall from the upper or rear end of the band-cutter, thus saving much grain which would otherwise be wasted.

The invention also has for its object to provide novel means for pivotally supporting a grain feeding pan, whereby it can be pivotally raised or swung in the arc of a circle for convenient access to the thrashing devices or to the front end portion of the separator.

To accomplish these objects my invention consists in the features of construction and the combination or arrangement of parts hereinafter described and claimed, reference being made to the accompanying drawings, in which—

Figure 1 is a side elevation, showing a portion of a grain separating machine with my invention applied thereto. Fig. 2 is a longitudinal sectional view of the same, showing a portion of the separating machine in side elevation. Fig. 3 is a detail front end elevation, showing a pair of the grain feeders and the crank-shaft by which they are operated. Fig. 4 is a detail longitudinal sectional view of one of the grain feeders. Fig. 5 is a top plan view of one of the grain feeders. Fig. 6 is a detail perspective view, showing a portion of the knife-guard and the shield for the band-cutting knives. Fig. 7 is a detail side view on a larger scale, of one of the band-cutting knives. Fig. 8 is a side elevation of the bracket or support for sustaining the band-cutter, and showing one of the pivoted brackets or supports for the grain feeders. Fig. 9 is an end elevation of the same. Fig. 10 is a top plan view of the same; and Fig. 11 is a detail view of a portion of one of the brackets or supports looking at the inner side thereof to show the construction for supporting the lower ends of the inclined guide-ways or rails hereinafter explained.

In order to enable those skilled in the art to make and use my invention, I will now describe the same in detail, referring to the drawings, wherein—

The numeral 1 indicates a portion of a grain-separating machine having at its front portion suitable thrashing devices, which, as here shown, are composed of a toothed-cylinder 2 and a toothed concave 3, from which projects a feed board or table 4, as usual. These parts may be of any construction suitable for the conditions required, but are preferably constructed and arranged as shown in Letters-Patent No. 412,064, issued October 1, 1889.

The frame of the separating machine is provided with horizontally projecting side arms 5, on each of which is mounted a bracket or support 6 having a forked or open bearing 7 to receive and support the roller or shaft 8 at the upper end of the band-cutter frame 9, which frame may be of any desired construction.

The band-cutter frame may be provided with the usual division-board 10, Figs. 1 and 2, and at the end of the frame, opposite the roller or shaft 8, is provided a similar roller or shaft 12, in such manner that an endless bundle-carrier or grain-table 13 can be supported by the rollers or shafts 8 and 12, and caused to travel by rotating the shaft or roller 8. The shaft or roller 8 is geared by a belt connection 15 with a drive-wheel 16 on a crank-shaft 17 journaled in brackets 18, which are pivoted at one end, as at 19, to pendent lugs 20 on the brackets or supports 6. The brackets 18 are provided with pivoted or eye-bolts 21 adapted to swing into and out of engagement with the slotted ends 22 of the brackets or supports 6, in such manner that when the pivoted or eye-bolts are disengaged from the said slotted ends of the brackets or supports 6, the brackets 18 can swing downward in the arcs of circles for swinging or raising the grain-feeding pans, as will hereinafter appear.

The crank-shaft 17 is connected by bearing blocks or hangers 23 with the grain feeders 24, Fig. 3, so that the rotation of the crank-shaft alternately reciprocates the grain-feeders in opposite directions. I have illustrated two grain feeders, and prefer this number, in that one balances the other in operation; but a single grain-feeder may be employed if desired.

In the practical operation of the invention, the roller or shaft 8 of the band-cutter may be utilized to operate the drive-wheel 16 of the crank-shaft 17, or the crank-shaft 17 may be driven for the purpose of rotating the shaft or rollers 8 of the band-cutter. I do not deem it necessary to illustrate any particular driving mechanism for the shaft or roller 8, or for the drive-wheel 16, as this constitutes no essential part of the invention, and any proper operating part of the separating machine, or of the band-cutter, may be employed to drive the shaft or roller 8, or the crank-shaft 17.

In order to permit the downward swinging motion of the brackets or supports 18, as hereinbefore explained, the belt connection 15 between the shaft or roller 8 and the drive-wheel 16 is provided with a belt tightener 15ª, which can be adjusted to loosen the belt 15 and permit its ready disengagement when the brackets or supports 18 are to be dropped downward for swinging the grain-feeding pans to a perpendicular position, or closely against the upper or inner end of the band-cutter. The belt-tightener 15ª may be of any desired construction. I have merely indicated one form of belt-tightener, but do not confine myself to any particular type. The knife-shaft 14, as here illustrated, is belted to the shaft of the cylinder 2, as shown in Fig. 1; but any suitable driving mechanism may be employed.

The grain-feeders 24 each comprise two grain-feeding pans 25 and 26, Fig. 5, having toothed or serrated portions to engage the grain and advance it toward the cylinder and concave of the separator. The lower pan 26 projects past or beyond the end of the upper pan 25 in the direction of the band-cutter frame, so that such lower pan 26 will extend beneath the delivery end of the bundle-carrier or grain-table 13 of the band-cutter, for the purpose of receiving trash, heads, and loose grain from the upper end of the band-cutter. The upper pan 25 is arranged above the pan 26 in such position as to receive the grain from the band-cutter, so that while the lower pan 26 projects under the band-cutter to receive the trash, heads, and loose grain, the main body of grain from the band-cutter does not require to fall such a great distance as would be necessary if the upper pan 25 were omitted. In the absence of the upper pan 25 there would be such a distance for the grain to travel from the delivery end of the bundle-carrier or grain-table 13 to the lower pan 26 that the grain would accumulate and the feeding thereof to the cylinder and concave could not be controlled. The upper and lower pans 25 and 26 are rigidly connected, so that they both move in unison, and the space intervening between the two pans is such that trash, heads, and loose grain received from the band-cutter by the lower pan 26 will be fed by the latter toward the cylinder and concave.

By providing a grain-feeder, composed of the upper and lower pans, constructed and arranged as described, I am enabled to take the trash, heads, and loose grain from the band-cutter and at the same time maintain perfect control of the grain in feeding it to the concave and cylinder. The lower grain-pan is preferably provided with projecting fingers 27, as described in my patent hereinbefore alluded to, for the purpose of more effectually controlling the flow of grain to the cylinder and concave according to the varying nature or condition of the grain. The lower grain-pan 26 rests and moves upon the grain board or table 4, and is supported thereby.

In a machine of the character alluded to, it is desirable to conveniently gain access to the thrashing devices, or to the front end portion of the grain-separating machine; and to accomplish this purpose the crank-shaft 17, which operates the grain-feeding pans, is mounted in the pivoted brackets 18, as hereinbefore explained, so that by loosening the pivoted or eye-bolts 21 the brackets 18 will swing downward in the arcs of circles and place the crank-shaft in such position that the grain-feeding pans can be swung on the crank-shaft to an approximately perpendicular position, or closely against the upper end of the band-cutter, thereby making a clear space by which to gain access to the cylinder and concave, or other parts at the front end of the separating machine.

The pivotal support for the grain-feeding pans is composed of the crank-shaft 17 and the pivoted brackets 18, and this pivotal support is important in the arrangement described, where the lower grain-feeding pan projects some distance beneath the upper end of the bundle-carrier or grain-table 13 of the band-cutter, as in this arrangement, when the parts are in working position, the crank-shaft 17 lies so far under the upper end of the band-cutter that the grain-feeding pans could not be properly raised to a perpendicular position or close against the upper end of the band-cutter; but by providing the pivotal support, as described and shown, the downwardly swinging motion of the brackets 18 moves the crank-shaft 17 in a direction toward the cylinder and concave, and at the same time lowers the pans away from the upper end of the band-cutter, in order to provide ample space for the swinging motion of the grain-feeding pans to a perpendicular position, or close against the upper end of the band-cutter.

The brackets or supports 6 and 18 are preferably composed of metal in skeleton form with strengthening ribs; but they may be of any construction and material suitable for the conditions required.

The highest parts of the brackets or supports 6 are provided with pulleys or roller bearings 28, and such highest parts of the brackets or supports 6 sustain the lower ends of inclined guide-ways or rails 29, the upper ends of which are braced to and supported by the top portion of the frame work of the grain-separating machine, in such manner that by removing the shaft or roller 8 of the band-cutter from the forked or open bearings 7 of the brackets or supports 6 the band-cutter can be bodily elevated on the inclined guide-ways or rails 29, for the transportation of the band-cutter with the separating machine.

The top portion of the separator frame is provided with a windlass 30, having a crank-handle 31 and connected with ropes or cables 32, which pass over guide-pulleys 28$^a$ at the upper ends of the inclined guide-ways or rails 29, and thence over the pulleys or roller bearings 28 to the lower portion of the upper end of the band-cutter frame, as clearly shown in Fig. 2, the construction being such that by turning the windlass 30 in the proper direction to wind up the ropes or cables 32, the upper end of the band-cutter frame will be elevated by the action of the pulleys or roller bearings 28 on the ropes or cables, thereby raising the shaft or roller 8 out of the forked or open bearings 7, and hauling the band-cutter up the inclined guide-ways or rails 29, to conveniently transport the band-cutter with the separating machine.

The inner sides of the brackets or supports 6 are provided with projecting lugs 34, Figs. 10 and 11, for engaging and bracing the lower ends of the guide-ways or rails 29; but I do not confine myself to any particular attachment of the guide-ways or rails to the brackets or supports 6.

The band-cutting knives for severing the bands of the bundles of grain are mounted spirally on the knife-shaft 14, and they may be keyed, or otherwise secured to the knife-shaft. The ends of the knife-shaft extend through the sides of the band-cutter frame, and are journaled in the upper ends of segmental arms or supports 35, having curved slots 36, through which clamping-bolts 37 pass and engage the band-cutter frame for rigidly clamping the arms or supports 35 in any desired position of vertical adjustment, in such manner that by raising or lowering the arms or supports 35, the knife-shaft 14 will be correspondingly raised or lowered.

The knife-guard, which is more clearly illustrated in Fig. 6, is composed of a base portion and an upwardly projecting portion, which portions are formed, as here shown, of separated parallel bars 38, and 39, so arranged as to provide slots through which the knives extend to sever the bands of the grain bundles. The base portion of the knife-guard composed of the separated bars 38, extends substantially parallel with the bundle-carrier or grain-table 13 of the band-cutter, while the upwardly projecting portion, composed of the separated bars 39, is arranged substantially at right angles to the bars 38, and to the bundle-carrier or grain-table 13, by which construction the grain will be properly caused to pass under the knife-guard, even though the grain be piled unduly high in front of the knife-guard, as will sometimes occur. In this respect my invention is advantageous over a knife-guard wholly arranged parallel or substantially so with the bundle-carrier or grain-table of the band-cutter, because in such construction the grain, if it piles up in front of the band-cutting knives, will not pass properly beneath the knife-guard; and, consequently, the working of the machine is unsatisfactory and inefficient. The knife-guard is supported by the arms or supports 35 through the medium of bars or brackets 40, Figs. 1, 2 and 6, rigidly attached to the upwardly projecting parts 39 of the knife-guard, and secured to the arms or supports 35, as clearly shown in Fig. 1, all in such manner that when the arms or supports 35 are raised or lowered, the knife-shaft and the knife-guard are simultaneously and correspondingly raised and lowered for the purpose of varying the position of the knives and knife-guard relatively to the bundle-carrier or grain-table of the band-cutter to suit the conditions required for large or small bundles, or for bundles which are wet and tangled, or for feeding loose grain to the separating machine through the band-cutter. The bars 38, composing the base portion of the knife-guard are provided with rabbeted edges 41, Fig. 6, to which are rigidly secured, in any suitable manner, the pendent wings or flanges 42 having inclined lower edges 43. A pair of these pendent wings or flanges is secured to each bar 38, and their object is to hold the grain down and prevent it from being carried up and wedged in between the bars of the knife-guard; while the inclined lower edges 43 cause the grain to more uniformly advance toward the cylinder and concave. This construction is very important and desirable, in that it materially contributes to preventing the choking or clogging of the knife-guard, or the winding of grain on the knife-shaft. The winding of grain on the knife-shaft is more particularly prevented by the peculiar arrangement of the knife-shaft entirely above the bars 38 of the knife-guard, because by this arrangement the knives are effectually cleared of straw before they rise to the level of the knife-shaft, and therefore the liability of grain winding on the knife-shaft is more effectually prevented than in those prior constructions where the knife-shaft is arranged beneath, or partly beneath, the slotted parts of the knife-guard.

The band-cutter is rendered more effective in practical operation by the peculiar construction of the band-cutting knives illustrated in Fig. 7. The band-cutting knives are each formed with a centrally enlarged disk-like center or body 44, the curved edges 45 of which extend from the bases of the cutting edges 46 to the bases of the rear edges 47 of the knives in such manner that the curved cutting edges 46 of the pointed knife-blades are tangential to the curved edges 45, and the latter operate to press down the straw while the band is being severed. The curved, unsharpened edges of the disk-like portion or body 44 constitute uniform continuations of the sharpened cutting edges 46, so that the action on the straw is such that the knives materially contribute to preventing the choking or clogging of the knife-guard and the band-cutter is rendered superior in operation. This has been practically demonstrated in the use of a large number of band-cutters having knives constructed according to my invention. In practice I prefer to provide the knife-guard with a curved shield 48 secured to the bars 38 and 39, as shown in Fig. 6, for the purpose of covering and shielding the band-cutting knives.

Having thus described my invention, what I claim is—

1. The combination with a band-cutter, and the thrashing devices of a grain-separator, of a vertically swinging grain-feeder composed of two pans arranged one above the other and adapted to swing upward for access to the thrashing devices, the upper pan receiving the grain from the band-cutter, the lower pan extending past the upper pan in the direction of the band-cutter to receive trash, heads, and loose grain therefrom, and both pans inclining downward from the band-cutter toward the thrashing devices, substantially as described.

2. The combination with a band-cutter, and the thrashing devices of a grain-separator, of a vertically swinging grain-feeder composed of two pans arranged one above the other, the upper pan receiving the grain from the band-cutter, and the lower pan extending past the upper pan in the direction of the band-cutter to receive trash, heads and loose grain therefrom, and pivoted brackets on which the grain-feeder is pivotally mounted to swing upward at its rear portion, substantially as and for the purposes described.

3. The combination with a band-cutter, and a thrashing device of a grain separator, of a vertically swinging grain-feeder pivotally supported at its front end portion to swing upward at its rear portion for access to the thrashing devices and composed of two pans arranged one above the other, the upper pan receiving the grain from the band-cutter, and the lower pan extending past the upper pan in the direction of the band-cutter to receive trash, heads, and loose grain therefrom, substantially as described.

4. The combination with a band-cutter, and the thrashing devices of a grain-separator, of a grain-feeder composed of two connected grain pans pivotally supported at their front portion between the band-cutter and the thrashing devices to swing upward on the pivotal support for access to the thrashing devices, the upper pan receiving the grain from the band-cutter, and the lower pan extending past the upper pan in the direction of the band-cutter to receive trash, heads, and loose grain therefrom, substantially as described.

5. The combination with a band-cutter, and the thrashing devices of a grain separator, of a grain feeder interposed between the band-cutter and the thrashing devices and composed of two connected grain-pans arranged one above the other to provide an intervening space, the upper pan receiving the grain from the band-cutter, and the lower pan extending past the upper pan in the direction of the band-cutter to receive trash, heads, and loose grain therefrom, and pivoted brackets on which the grain-feeder is pivotally mounted at its front portion, so that it can swing upward at its rear portion to gain access to the thrashing devices substantially as described.

6. The combination with a band-cutter, and the thrashing devices of a grain separator, of a crank-shaft, pivoted supports for the crank-shaft, adapted to swing downward, devices for holding the said supports in their highest positions, and a grain-feeder adapted to swing in a vertical plane on the crank-shaft when the said supports are swung downward and interposed between the band-cutter and the thrashing devices of the separator, substantially as described.

7. The combination with a band-cutter, and the thrashing devices of a grain-separator, of a grain-feeder interposed between the band-cutter and the thrashing devices, drop-brackets pivoted at their rear ends and adapted to drop downward at their rear ends and on which rear ends the grain-feeder is pivotally supported, and devices for rigidly holding the said drop-brackets in their highest positions, substantially as described.

8. The combination with a band-cutter, and the thrashing devices of a grain-separator, of a crank-shaft, a grain-feeder supported by the crank-shaft and adapted to swing in a vertical plane thereupon, drop-brackets carrying the crank-shaft and pivoted at their rear portions to swing downward, and bolts for rigidly holding the said drop-brackets in their highest positions, substantially as described.

9. The combination with a band-cutter, and the thrashing devices of a grain separator, of a crank-shaft, a grain-feeder supported by the crank-shaft and adapted to swing thereupon in a vertical plane, pivoted brackets or supports in which the crank-shaft is journaled, and pivoted bolts adapted to engage and disengage parts of the frame of the grain-separator for holding the pivoted brackets or supports in operative position, substantially as described.

10. The combination with the thrashing devices of a grain-separator, of stationary brackets or supports mounted on the grain-separator, a band-cutter having its upper or inner end engaged with the stationary brackets or supports, pivoted swinging brackets or supports having detachable bolt connections with the stationary brackets or supports, a crank-shaft journaled in the pivoted brackets or supports, and a grain-feeder supported and operated by the crank-shaft, substantially as described.

11. The combination with the thrashing devices of a grain separator, of stationary brackets or supports mounted on the separator, a band-cutter engaged with the stationary brackets or supports, pivoted brackets or supports having detachable bolt connections with the stationary brackets or supports, a crank-shaft journaled in the pivoted brackets or supports, and a grain-feeder adapted to swing on the crank-shaft and composed of two grain pans arranged one above the other, the upper pan receiving the grain from the band-cutter, and the lower pan extending past the upper pan in the direction of the band-cutter to receive trash, heads, and loose grain therefrom, substantially as described.

12. The combination with the frame of a grain-separator, of brackets or supports having slotted portions, pivoted brackets or supports having pivoted bolts for detachably engaging the slotted portions of the brackets or supports on the separator-frame, a shaft carried by the pivoted brackets or supports, and a grain-feeder mounted on the said shaft and adapted to swing in a vertical plane, substantially as and for the purposes described.

13. The combination with the frame of a grain-separator, of inclined guide-ways or rails, guide-pulleys at the upper and lower ends of the guide-ways or rails, a band-cutter detachably mounted in bearings on a part of the separator frame, a windlass, and cables connected with the windlass, passing over the guide-pulleys of the guide-ways or rails, and connected with the band-cutter for lifting the upper end of the latter out of said bearings and sliding the band-cutter upward on the guide-ways or rails, substantially as described.

14. The combination with the frame of a grain - separator, of brackets or supports mounted thereupon and having forked or open bearings, a band-cutter removably engaged with said forked or open bearings, inclined guide-ways or rails attached at their lower ends to the brackets or supports and connected at their upper ends with the separator frame, pulleys at the upper ends of the guide-ways or rails, pulleys arranged at the lower ends of the guide-ways or rails and located at a level or height above the forked or open bearings of said brackets or supports, a windlass, and cables connected with the windlass, passing over the pulleys of the guide-ways or rails, and connected with the band-cutter for raising the latter out of engagement with the forked or open bearings and elevating said band-cutter on the guide-ways or rails, substantially as described.

15. The combination with the bundle-carrier or grain-table of a band-cutter, of vertically adjustable arms mounted on the sides of the band-cutter, a knife-shaft mounted in said arms, a non-rotary angular knife-guard composed of a slotted base-portion and a slotted upwardly projecting portion, bars secured to the said upwardly projecting portion of the knife-guard and attached to the said vertically adjustable arms, and means for adjusting the said arms, substantially as and for the purposes described.

In testimony whereof I have hereunto set my hand and affixed my seal in presence of two subscribing witnesses.

VICTOR C. BAILEY. [L. S.]

Witnesses:
ALBERT H. NORRIS,
JAMES L. NORRIS.